(12) United States Patent
Liu

(10) Patent No.: US 8,219,156 B2
(45) Date of Patent: Jul. 10, 2012

(54) TRANSCEIVER DEVICE AND POWER SAVING METHOD THEREOF

(75) Inventor: Tsu-Chun Liu, Hsinchu (TW)

(73) Assignee: IC Plus Corp., Hsin-Chu (TW)

(*) Notice: Subject to any disclaimer, the term of this patent is extended or adjusted under 35 U.S.C. 154(b) by 503 days.

(21) Appl. No.: 12/247,423

(22) Filed: Oct. 8, 2008

(65) Prior Publication Data
US 2010/0029346 A1    Feb. 4, 2010

(30) Foreign Application Priority Data
Jul. 30, 2008  (TW) .............................. 97128853 A

(51) Int. Cl.
*H04W 4/00* (2009.01)
(52) U.S. Cl. ........................ 455/574; 455/432.2; 375/219
(58) Field of Classification Search .................. 455/574, 455/73, 78, 552.1, 553.3, 432.2; 375/219
See application file for complete search history.

(56) References Cited

U.S. PATENT DOCUMENTS

| | | | | |
|---|---|---|---|---|
| 5,841,390 A * | 11/1998 | Tsui | ............................. | 341/173 |
| 6,137,840 A * | 10/2000 | Tiedemann et al. | .......... | 375/297 |
| 6,341,224 B1 * | 1/2002 | Dohi et al. | .................... | 455/522 |
| 7,012,472 B2 * | 3/2006 | Xu et al. | ......................... | 331/16 |
| 2008/0267270 A1 * | 10/2008 | Darabi | .......................... | 375/219 |

* cited by examiner

Primary Examiner — Kamran Afshar
Assistant Examiner — Kenneth Corbin
(74) Attorney, Agent, or Firm — J.C. Patents

(57) ABSTRACT

A transceiver device and a power saving method thereof are provided. The transceiver device includes a transmitter, a receiver, and a control module. The control module is coupled to the transmitter and the receiver. After the control module lowers the output power of either the transmitter, the receiver, or both of them, the control module checks a signal transmission between the transceiver device and a far-end device is normal or not. When the signal transmission between the transceiver device and the far-end device is abnormal, the control module readjusts the output power of the transmitter, the receiver, or both of them. Thereby, the power consumption of the transceiver device is decreased.

12 Claims, 3 Drawing Sheets

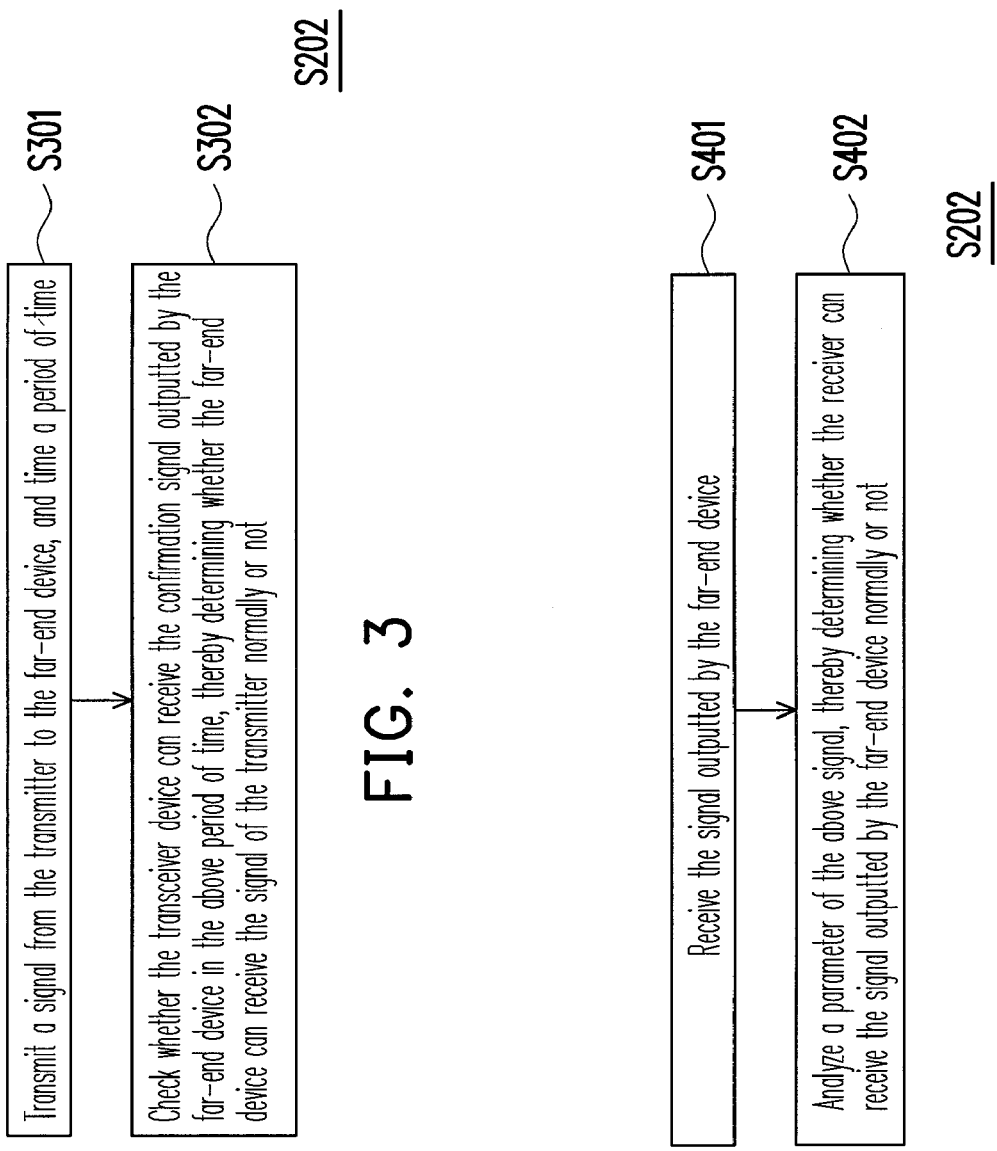

US 8,219,156 B2

TRANSCEIVER DEVICE AND POWER SAVING METHOD THEREOF

CROSS-REFERENCE TO RELATED APPLICATION

This application claims the priority benefit of Taiwan application serial no. 97128853, filed Jul. 30, 2008. The entirety of the above-mentioned patent application is hereby incorporated by reference herein and made a part of this specification.

BACKGROUND OF THE INVENTION

1. Field of the Invention

The present invention generally relates to a transceiver device, in particular, to a power saving technique of a transceiver device.

2. Description of Related Art

In a communication system, usually a transceiver device is used to transmit signals. The transceiver device includes a transmitter (TX) and a receiver (RX). The transmitter is used to output signals, and the receiver is used to receive signals.

Generally speaking, the output power adopted when the transmitter outputs a signal must comply with the standard prescribed by Institute of Electrical and Electronics Engineers (IEEE).

Therefore, in the prior art, when the transmitter of the transceiver device outputs a signal to the far-end device via a transmission path, even a distinct short length of the transmission path may not cause a severe signal attenuation, the transmitter still complies with the standard prescribed by IEEE, and outputs the signal at the output power prescribed by IEEE, thereby causing quite a large amount of power waste for the transmitter.

SUMMARY OF THE INVENTION

Accordingly, the present invention is directed to a transceiver device, which is used to decrease the power consumption.

The present invention is further directed to a power saving method of a transceiver device, which is used to save power.

The present invention provides a transceiver device, which includes a transmitter, a receiver, and a control module. The control module is coupled to the transmitter and the receiver. After the control module lowers the output power of either the transmitter, the receiver, or both of them, the control module checks a signal transmission between the transceiver device and a far-end device is normal or not. When the signal transmission between the transceiver device and the far-end device is abnormal, the control module readjusts the output power of the transmitter, the receiver, or both of them.

In an embodiment of the present invention, the control module includes a timer and an analysis circuit. When the transmitter transmits a signal to the far-end device, the timer times a period of time. The analysis circuit is coupled to the receiver and the timer, for checking whether the transceiver device receives a confirmation signal outputted by the far-end device in the above period or not, thereby determining whether the far-end device can receive the signal outputted by the transmitter normally or not.

In an embodiment of the present invention, the control module includes an analysis circuit. The analysis circuit is coupled to the receiver, for receiving a signal outputted by the far-end device, and analyzing a parameter of the signal, thereby determining whether the transceiver device can receive the signal outputted by the far-end device normally or not. In another embodiment, the parameter includes intensity, signal-to-noise ratio (SNR), power, or a combination thereof.

In an embodiment of the present invention, the transmitter includes an adjustable power supply. The adjustable power supply is coupled to the control module, and controlled by the control module to adjust the output power. In another embodiment, the adjustable power supply is an adjustable voltage source or an adjustable current source.

From another aspect, the present invention provides a power saving method of a transceiver device. The transceiver device includes a transmitter and a receiver. The power saving method of the transceiver device includes lowering the output power of the transmitter, the receiver, or both of them. Moreover, whether a signal transmission between the transceiver device and the far-end device is normal or not is checked. When the signal transmission between the transceiver device and the far-end device is abnormal, the output power of the transmitter, the receiver, or both of them is readjusted.

In an embodiment of the present invention, the step of checking whether a signal transmission between the transceiver device and the far-end device is normal or not includes determining whether the far-end device can receive the signal outputted by the transmitter normally or not. In another embodiment of the present invention, the step of checking whether a signal transmission between the transceiver device and the far-end device is normal or not includes determining whether the transceiver device can receive the signal outputted by the far-end device normally or not.

The present invention lowers the output power of the transmitter, the receiver, or both of them. In addition, when the signal transmission between the transceiver device and the far-end device is abnormal, the output power of the transmitter, the receiver, or both of them is readjusted. Thereby, the power consumption of the transceiver device is decreased.

In order to make the aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a flow chart of processes of checking whether a signal transmission between the transceiver device and a far-end device is normal or not according to the first embodiment of the present invention.

FIG. 4 is a flow chart of processes of checking whether a signal transmission between the transceiver device and the far-end device is normal or not according to a second embodiment of the present invention.

DESCRIPTION OF THE EMBODIMENTS

Figure 1:
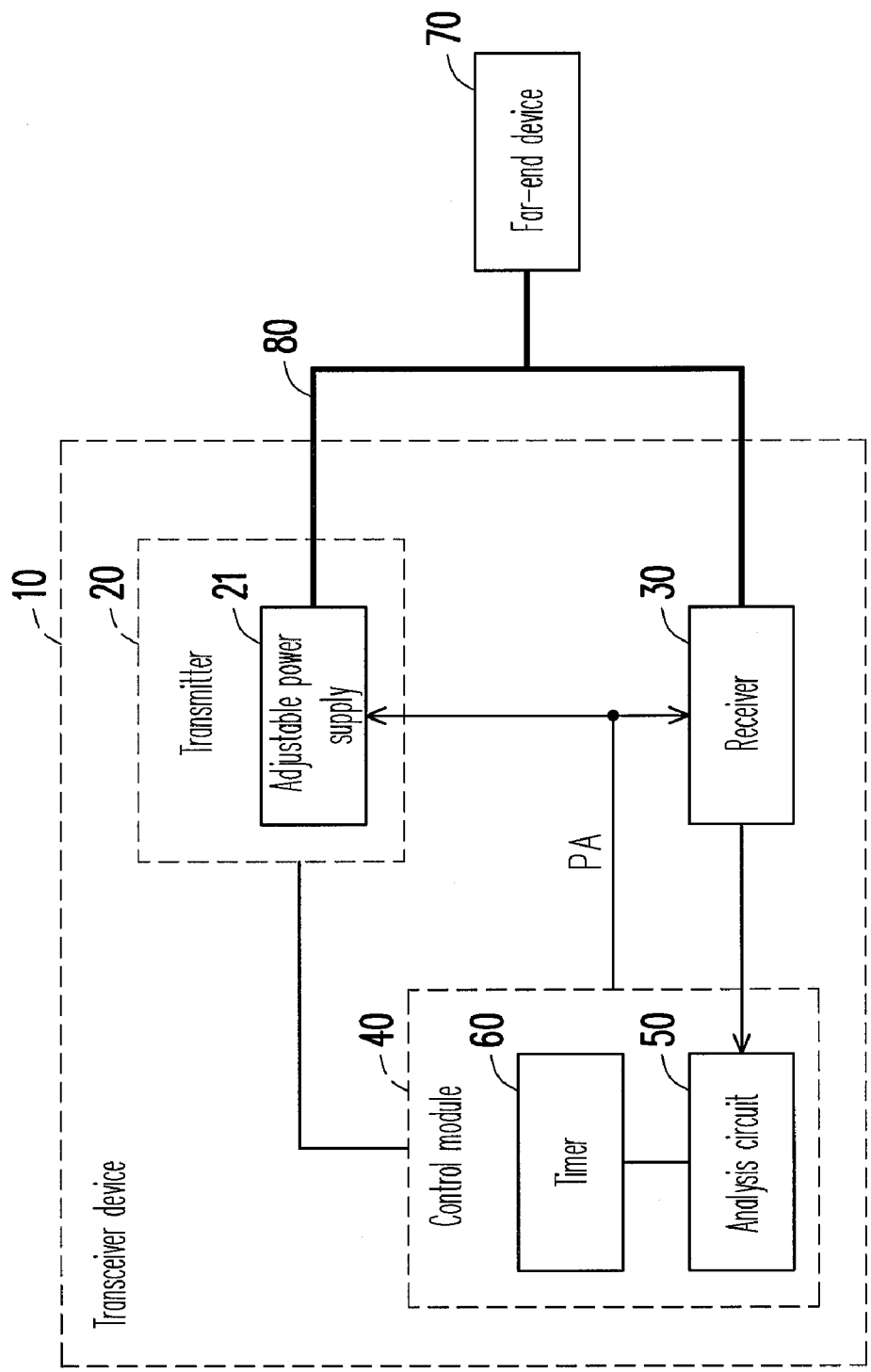
FIG. 1 is a schematic view of a transceiver device according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the prior art, the output power of the transmitter is required to conform to the standard prescribed by IEEE, thus the transmitter may consume a large amount of power. In view of this, an embodiment of the present invention provides a power saving technique for a transceiver device, for lowering the output power of the transmitter, the receiver, or both of them. Moreover, when the signal transmission between the transceiver device and a far-end device is abnormal, the output power of the transmitter, the receiver, or both of them is readjusted. Therefore, the power consumption of the transmitter is decreased, so as to save power. Hereinafter the further illustration is given with reference to the accompanying drawings.

The First Embodiment

FIG. 1 is a schematic view of a transceiver device according to a first embodiment of the present invention. Referring to FIG. 1, in this embodiment, the transceiver device 10 includes a transmitter 20, a receiver 30, and a control module 40. The control module 40 includes an analysis circuit 50 and a timer 60. Moreover, the transmitter 20 includes an adjustable power supply 21. The transceiver device 10 may communicate with a far-end device 70 via a transmission path 80. The transmission path 80 is, for example, a transmission line, the far-end device 70 is, for example, a far-end transceiver device, and the far-end device 70 in other embodiments may also be other communication equipment. Moreover, in this embodiment, an adjustable voltage source is taken as an example of the adjustable power supply 21 for illustration. The control module 40 may output a control signal PA to adjust the output voltage of the adjustable voltage source.

In this embodiment, the adjustable power supply 21 of the transmitter 20 is coupled to the transmission path 80, the receiver 30, and the control module 40. The receiver 30 is coupled to the transmission path 80 and the analysis circuit 50. The analysis circuit 50 is coupled to the timer 60. The transmitter 20 is used to output a transmission signal. More specifically, the transmitter 20 may transmit a signal to the far-end device 70 via the transmission path 80. The receiver 30 is used to receive the transmission signal outputted by the far-end device 70. The control module 40 may output the control signal PA to control the output power of the transmitter 20, the receiver 30, or both of them. More specifically, in this embodiment, the control module 40 may control the output voltage of the adjustable power supply 21. Moreover, the control module 40 may enable or disable the modules of the receiver 30, such as a filter module, an echo cancellation module, a circuit protection module, an analog-to-digital converter (ADC), and an amplification module. In other embodiments, the control module 40 may adjust power of the said modules in the receiver 30.

Further, the analysis circuit 50 may be used to check whether a confirmation signal outputted from the far-end device 70 is received or not. In addition, the analysis circuit 50 may also be used to analyze a parameter of the signal outputted by the far-end device 70. The parameter is, for example, an intensity, a signal-to-noise ratio (SNR), a power, or a combination thereof. The timer 60 is used to time a period of time.

Figure 2:
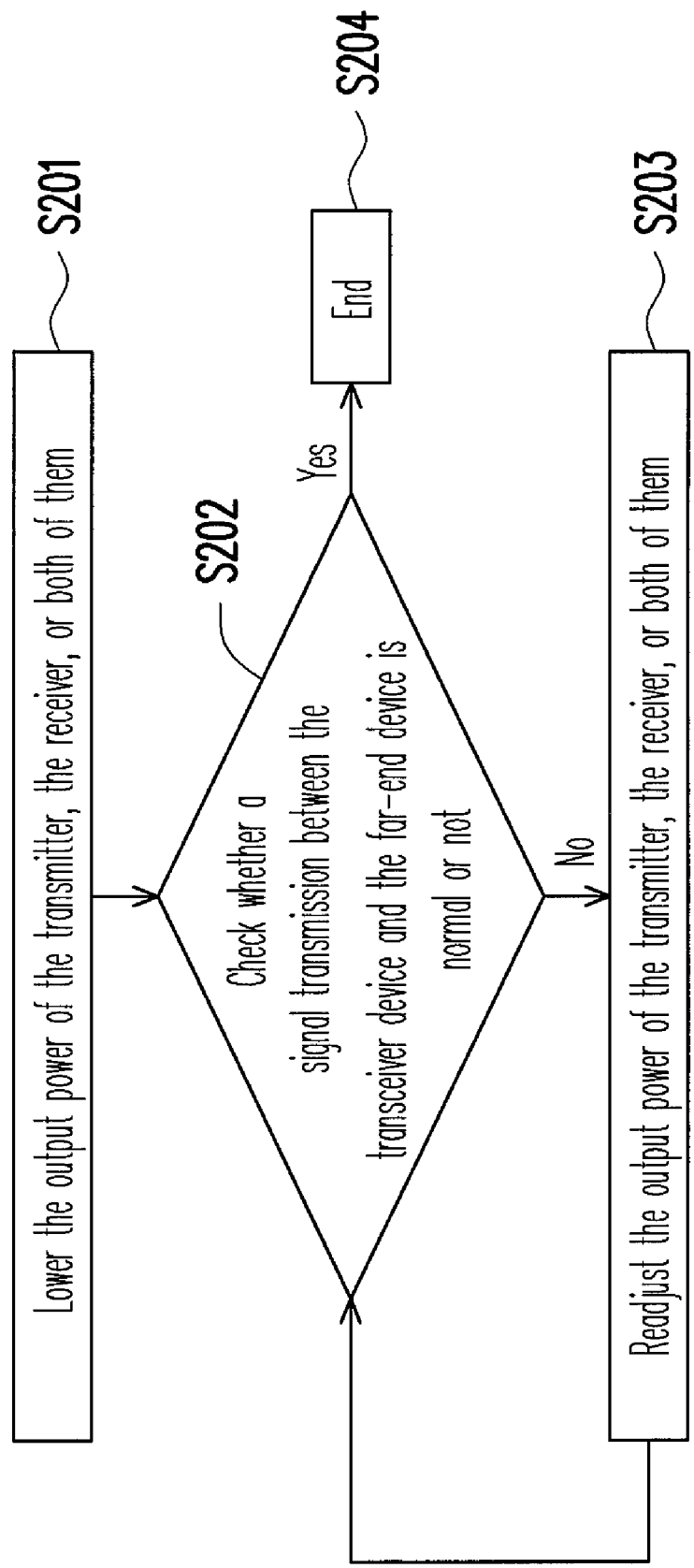
FIG. 2 is a flow chart of processes of a power saving method of a transceiver device according to the first embodiment of the present invention.

FIG. 2 is a flow chart of processes of a power saving method of a transceiver device according to the first embodiment of the present invention. FIG. 3 is a flow chart of processes of checking whether a signal transmission between the transceiver device and a far-end device is normal or not according to the first embodiment of the present invention.

Referring to FIGS. 1, 2, and 3, firstly in Step S201, the control module 40 lowers the output power of the transmitter 20, the receiver 30, or both of them. In this embodiment, lowering the output power of the transmitter 20 is taken as an example for illustration. Generally speaking, a preset value of the output power of the transmitter 20 may conform to the standard prescribed by the IEEE. However, in this embodiment, the control module 40 may directly lower the output power of the transmitter 20 without any information as a basis. Hereinafter the detailed description of lowering the output power of the transmitter 20 is provided for the reference of persons skilled in the art.

For example, the output power of the adjustable power supply 21 is adjusted to 80% of that prescribed by IEEE. The above embodiment of adjusting the output power of the adjustable power supply 21 to 80% of that prescribed by IEEE is an optional embodiment, and persons skilled in the art may adjust the output power of the adjustable power supply 21 to be less than the output power prescribed by IEEE as demanded, so as to save power.

Moreover, in order to avoid the abnormal transmission between the transceiver device 10 and the far-end device 70 caused by Step S201, Steps S202-S204 are further provided in this embodiment to eliminate the problem. In Step S202, whether a signal transmission between the transceiver device and the far-end device is normal or not is checked. If the checking result in Step S202 is normal, Step S204 is executed, and the method is ended; otherwise, Step S203 is executed to readjust the output power of the transmitter 20, the receiver 30, or both of them. Hereinafter, Step S202 is illustrated in detail firstly.

In this embodiment, Step S202 includes, for example, Steps S301 and S302. Firstly in Step S301, the transmitter 20 transmits a signal to the far-end device 70, and times a period of time. More specifically, the adjustable power supply 21 of the transmitter 20 may output a signal to the far-end device 70 at 80% of the output power prescribed by IEEE. Meanwhile, the timer 60 of the control module 40 may time a period of time, which may be, but not limited to, 1 second. In other embodiments, persons skilled in the art may define the span of the above period.

It should be noted that, when receiving the signal in Step S301, the far-end device 70 may analyze a parameter of the signal, such as an intensity, a signal-to-noise ratio (SNR), a power, or a combination thereof. If the parameter of the signal is greater than a threshold, the far-end device 70 may output a confirmation signal to the transceiver device 10, for indicating that the far-end device 70 can normally receive the signal transmitted by the transceiver device 10 at 80% of the output power prescribed by IEEE. If the parameter of the signal is less than the above threshold, the far-end device 70 will not output the confirmation signal to the transceiver device 10, so as to indicate that the far-end device 70 can not normally receive the signal transmitted by the transceiver device 10 at 80% of the output power prescribed by IEEE.

From the view of the transceiver device 10, Step S302 may be executed after Step S301, so as to check whether the transceiver device 10 receives the confirmation signal transmitted by the far-end device 70 in the above period of time, thereby determining whether the far-end device 70 can receive the signal outputted by the transmitter 20 normally or not. More specifically, the transceiver device 10 may check whether or not the confirmation signal outputted from the far-end device 70 is received within the period of 1 second after the transceiver device 10 outputs the signal to the far-end device 70, thereby determining whether the far-end device 70 can normally receive the signal transmitted by the transmitter 20 at 80% of the output power prescribed by IEEE or not.

In this embodiment, it is assumed that the far-end device 70 cannot normally receive the signal transmitted by the transmitter 20 at 80% of the output power prescribed by IEEE. Therefore, the transceiver device 10 cannot receive the confirmation signal outputted by the far-end device 70 in the above period of time. Step S203 is then executed to readjust the output power of the transmitter 20, the receiver 30 or both of them. In this embodiment, Step S203 is, for example, adjusting the output power of the transmitter 20 to be 80%-100% of the output power prescribed by IEEE, such as 90% of the output power prescribed by IEEE.

Then Step S202 is repeated to confirm whether the far-end device 70 can receive the signal outputted by the transmitter 20 normally or not. If the far-end device 70 can normally receive the signal outputted by transmitter 20 at 90% of the output power prescribed by IEEE, Step S204 is executed after Steps S301 and S302, and the process is ended. Therefore, the transceiver device 10 may fix the output power of the transmitter 20 at 90% of that prescribed by IEEE. Thereby, the transceiver device 10 may save power, and further ensure the normal signal transmission between the transceiver device 10 and the far-end device 70.

It should be noted that, Steps S201-S204 in this embodiment may be executed during an auto negotiation between the transceiver device 10 and the far-end device 70, but the present invention is not limited to this. In other embodiments, Steps S201-S204 may also be executed before the transceiver device 10 transmits consecutive signals to the far-end device 70. For example, in a Gigabit Ethernet, after the auto negotiation is finished, the transmitter may transmit consecutive signals in a first coding manner, and the receiver may receive the consecutive signals of the far-end device so as to adjust the digital signal processing (DSP) parameter of the receiver. When the receiver receives the signals transmitted by the far-end device correctly, the transmitter then transmits signals in a second coding manner so as to inform the far-end device that the adjustment of the receiver has been finished. Through Steps S201-S204 in this embodiment, the transceiver device 10 may output the transmission signal by the transmitter 20 with an appropriate output power, so as to alleviate the power waste of the transmitter in the prior art caused by the IEEE standard.

Although the above embodiment has shown a possible aspect of the transceiver device and the power saving method thereof, persons of ordinary skill in the art may know that, different manufacturers have different designs for the transceiver device and the power saving method, therefore, the present invention is not intended to limit the possible aspects. In order words, all the technical solutions containing the feature of "lowering the output power of the transmitter, the receiver, or both of them, and readjusting the output power of the transmitter, the receiver, or both of them when a signal transmission between the transceiver device and the far-end device is abnormal" may comply with the spirit of the present invention. Hereinafter some other embodiments are illustrated for persons of ordinary skill in the art to further understand the spirit of the present invention, and thereby implement the present invention.

Referring to FIG. 1, in the above embodiment, the adjustable voltage source is taken as an example for illustrating the adjustable power supply 21, but is not used to limit the present invention. In other embodiments, the adjustable power supply 21 may also be the adjustable current source. The control module 40 may adjust the output current of the adjustable current source based on the control signal PA, thereby also achieving a similar efficacy as the above embodiment.

Furthermore, in the above embodiment, the transmission line is taken as an example for illustrating the transmission path 80, but is not used to limit the present invention. In other embodiments, a wireless transmission may also be adopted between the transceiver device 10 and the far-end device 70. In other words, the transmission path 80 may also be an unguided media, which is also referred to as a wireless communication medium.

Referring to FIG. 1 and FIG. 2, in the above embodiment, in Step S201, the control module 40 merely lowers the output power of the transmitter 20. However, the embodiment is merely an optional embodiment, and is not used to limit the present invention. In other embodiments, in Step S201, the control module 40 may also lower the output power of the receiver 30 or the output power of both the transmitter 20 and the receiver 30. In addition, in the above embodiment, Step S202 includes, for example, Step S301 and S302, but the present invention is not limited to this. In other embodiments, persons skilled in the art may employ other manners to implement Step S202 according to the Step S201. Hereinafter, another embodiment is given for more specific illustration.

The Second Embodiment

FIG. 4 is a flow chart of processes of checking whether a signal transmission between the transceiver device and the far-end device is normal or not according to a second embodiment of the present invention. Referring to FIG. 1, FIG. 2, and FIG. 4, the Step S201 in this embodiment may merely lower the output power of the receiver 30. More specifically, the control module 40 may disable at least one module (not shown) of the receiver 30 without any information as a basis. The above module is, for example, a filter module, an echo cancellation module, a circuit protection module, an amplification module, an ADC, or a combination thereof. In this embodiment, the Step S201 of disabling the filter module and the echo cancellation module of the receiver 30 is taken as an example for illustration.

Then Step S401 and S402 are executed to implement Step S202. In Step S401, the transceiver device 10 may receive the signal outputted by the far-end device 70 through the receiver 30. Then in Step S402, the analysis circuit 50 analyzes a parameter of the signal, thereby determining whether the transceiver device 10 can receive the signal outputted by the far-end device 70 normally or not. More specifically, the analysis circuit 50 may analyze an intensity, a signal-to-noise ratio (SNR), a power, or a combination thereof of the above signal. When the intensity, the SNR, the power, or the combination thereof of the signal is greater than a threshold, it indicates that the transceiver device 10 can receive the signal outputted by the far-end device 70 normally when disabling the filter module and the echo cancellation module of the receiver 30, and thus Step S204 is executed, and the process is ended. Otherwise, when the intensity, the SNR, the power, or the combination thereof of the signal is less than the threshold, it indicates that the transceiver device 10 cannot receive the signal outputted by the far-end device 70 normally when disabling the filter module and the echo cancellation module of the receiver 30, and thus Step S203 is executed. It should be noted that, persons skilled in the art may define the above threshold as demanded.

In this embodiment, it is assumed that the transceiver device 10 cannot receive the signal outputted by the far-end device 70 normally when disabling the filter module and the echo cancellation module of the receiver 30, and thus Step S203 is executed after Step S202. In this embodiment, Step S203 may be, for example, enabling the echo cancellation module. Then, Step S202 is executed again to check a signal transmission between the transceiver device 10 and the far-end device 70 is normal or not when the transceiver device 10 merely disables the filter module. If the signal transmission between the transceiver device 10 and the far-end device 70 is normal when the transceiver device 10 merely disables the filter module, Step S204 is then executed, and the process is ended. Thereby, the transceiver device 10 may not only save power, but also ensure the normal signal transmission between the transceiver device 10 and the far-end device 70.

In the foregoing embodiment, the control module 40 merely disabling the filter module and the echo cancellation module of the receiver 30 in Step S201. The embodiment is an optional embodiment so that the present invention should not be limited in such embodiment. In other embodiments, the control module 40 can lower power of the above modules of the receiver 30 in Step S201, such as the circuit protection module, the amplification module, the ADC, or a combination thereof. For example, in the Step S201, the control module 40 may lower power of the ADC of the receiver 30.

It should be noted that, in another embodiment, the first embodiment and the second embodiment are implemented together. In other words, in Step S201, the control module 40 may lower the output power of both the transmitter 20 and the receiver 30. Then in Step S202, the transceiver device 10 may check whether the transceiver device 10 receives the signal received by the far-end device 70 normally or not, and meanwhile the transceiver device 10 may also determine whether the far-end device 70 receives the signal outputted by the transceiver device 10 normally or not. When the transceiver device 10 cannot receive the signal outputted by the far-end device 70 normally or the far-end device 70 cannot receive the signal outputted by the transceiver device 10 normally, Step S203 may be executed to readjust the output power of the transmitter 20, the receiver 30, or both of them, thereby achieving the similar efficacy as the above, and shortening the time for adjusting the output power of the transmitter 20 and the receiver 30.

Based on the above, the present invention may lower the output power of the transmitter, the receiver, or both of them, and readjust the output power of the transmitter, the receiver, or both of them when the signal transmission between the transceiver device and the far-end device is abnormal. Therefore, the power consumption of the transceiver device is decreased, and a normal signal transmission between the transceiver device and the far-end device can be ensured. In addition, the embodiments of the present invention have at least the following advantages.

1. The control module may directly lower the output power of the transmitter, the receiver, or both of them without any information as a basis, thereby simplifying the implementation and achieving the power saving efficacy.

2. After the output power of the transmitter, the receiver, or both of them is lowered, Steps S202-S204 may ensure the normal signal transmission between the transceiver device and the far-end device.

3. The output power of the transmitter 20 and the receiver 30 is lowered at the same time, thereby shortening the time for adjusting the output power of the transmitter 20 and the receiver 30.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. A transceiver device, comprising:
    a transmitter;
    a receiver; and
    a control module, coupled to the transmitter and the receiver, for checking a signal transmission between the transceiver device and a far-end device is normal or not after lowering output power of the transmitter, the receiver or both of them, wherein when the signal transmission between the transceiver device and the far-end device is abnormal, the control module readjusts the output power of the transmitter and the receiver;
    wherein, the transmitter transmits a plurality of signals encoded by at least two different encoding formats separately in sequence to the far-end device, and the control module checks the encoding format of each of a plurality of received signals encoded by a first encoding format from the far-end device received by the receiver to determine the signal transmission between the transceiver device and the far-end device is normal or not, and the transmitter transmits a plurality of transmitted signals encoded by a second encoding format to inform the far-end device that the adjustment of the receiver has been finished when the signal transmission between the transceiver device and the far-end device is normal.

2. The transceiver device according to claim 1, wherein the control module comprises:
    a timer, for timing a period of time when the transmitter transmits a signal to the far-end device; and
    an analysis circuit, coupled to the receiver and the timer, for checking whether the transceiver device receives a confirmation signal outputted by the far-end device in the above period of time or not, thereby determining whether the far-end device can receive the signal output from the transmitter normally or not.

3. The transceiver device according to claim 1, wherein the control module comprises:
    an analysis circuit, coupled to the receiver, for receiving a signal outputted by the far-end device, and analyzing a parameter of the signal, thereby determining whether the transceiver device can receive the signal outputted by the far-end device normally or not.

4. The transceiver device according to claim 3, wherein the parameter comprises an intensity of the signal, a signal-to-noise ratio (SNR), a power, or a combination thereof.

5. The transceiver device according to claim 1, wherein the transmitter comprises:
    an adjustable power supply, coupled to the control module, and controlled by the control module to adjust the output power.

6. The transceiver device according to claim 5, wherein the adjustable power supply is an adjustable voltage source or an adjustable current source.

7. A power saving method of a transceiver device, wherein the transceiver device comprises a transmitter and a receiver, the method comprising:
    lowering output power of the transmitter and the receiver;
    checking whether a signal transmission between the transceiver device and a far-end device is normal or not; and
    readjusting the output power of the transmitter and the receiver when the signal transmission between the transceiver device and the far-end device is abnormal,
    wherein, a plurality of signals encoded by at least two different encoding formats separately transmitted by the transmitter to the far-end device in sequence, and the encoding format of each of a plurality of received signals encoded by a first encoding format from the far-end device received by the receiver is checked by a control module for determining the signal transmission between the transceiver device and the far-end device is normal or not, and the transmitter transmits a plurality of transmitted signals encoded by a second encoding format to inform the far-end device that the adjustment of the receiver has been finished when the signal transmission between the transceiver device and the far-end device is normal.

8. The power saving method of a transceiver device according to claim 7, wherein the step of checking whether the signal transmission between the transceiver device and the far-end device is normal or not comprises:
   determining whether the far-end device can receive a signal outputted by the transmitter normally or not.

9. The power saving method of a transceiver device according to claim 8, wherein the step of determining whether the far-end device can receive the signal outputted by the transmitter normally or not comprises:
   transmitting a signal from the transmitter to the far-end device, and timing a period of time; and
   checking whether the transceiver device receives a confirmation signal outputted by the far-end device in the above period of time or not, thereby determining whether the far-end device can receive the signal outputted by the transmitter normally or not.

10. The power saving method of a transceiver device according to claim 7, wherein the step of checking whether the signal transmission between the transceiver device and the far-end device is normal or not comprises:
    determining whether the transceiver device can receive a signal outputted by the far-end device normally or not.

11. The power saving method of a transceiver device according to claim 10, wherein the step of determining whether the transceiver device can receive the signal outputted by the far-end device normally or not comprises:
    receiving the signal outputted by the far-end device; and
    analyzing a parameter of the signal, thereby determining whether the transceiver device can receive the signal outputted by the far-end device normally or not.

12. The power saving method of a transceiver device according to claim 11, wherein the parameter comprises an intensity of the signal, a signal-to-noise ratio (SNR), a power, or a combination thereof.

\* \* \* \* \*